(No Model.)
W. L. NEGBAUR & J. J. FEELY.
MECHANICAL AND ELECTRICAL DEVELOPMENT AND STORAGE OF WIND POWER.
No. 554,138. Patented Feb. 4, 1896.
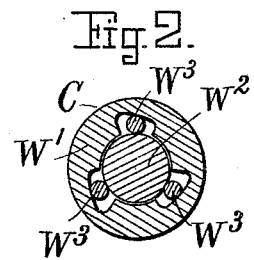
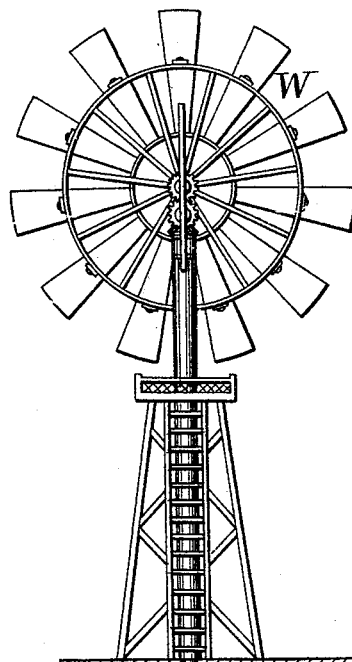
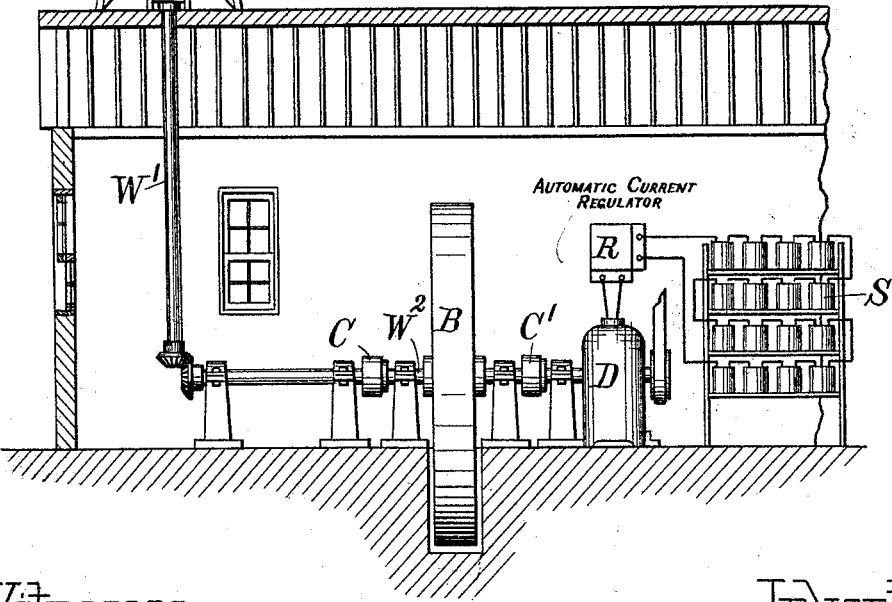

UNITED STATES PATENT OFFICE.

WALTER L. NEGBAUR, OF BROOKLINE, AND JOSEPH J. FEELY, OF WALPOLE, MASSACHUSETTS.

MECHANICAL AND ELECTRICAL DEVELOPMENT AND STORAGE OF WIND-POWER.

SPECIFICATION forming part of Letters Patent No. 554,138, dated February 4, 1896.

Application filed October 9, 1895. Serial No. 565,190. (No model.)

*To all whom it may concern:*

Be it known that we, WALTER L. NEGBAUR, of Brookline, and JOSEPH J. FEELY, of Walpole, in the county of Norfolk, State of Massachusetts, citizens of the United States, have invented certain new and useful Improvements in and for the Mechanical and Electrical Development and Storage of Wind-Power, of which the following is a specification.

Our invention relates to improvements in devices whereby the power of wind operating through a windmill of any suitable construction or character may be utilized for the performance of useful work of any kind; and its object is to improve the construction of devices of this character, whereby the defects formerly existing may be removed and the efficiency of the device as a whole materially increased.

While, as has been said, the benefit of our invention may be had in connection with the performance of any useful work which a windmill is capable of doing, we have in the present case represented it as applied particularly to the work of developing and storing an electric current or currents, which currents when developed may be utilized in any desired manner.

We have represented an embodiment of our improvement in the accompanying drawings, in which—

Figure 1 represents a side elevation of one form of our device; and Fig. 2 is a representation in cross-section, on an enlarged scale, of a clutch mechanism hereinafter more fully described.

The device represented in Fig. 1 includes a wind-motor W of any approved type, the power developed by which is communicated to a working shaft $W^2$, which working shaft carries and drives the armature of a dynamo D.

In the various devices by which it has heretofore been attempted to utilize wind-power, particularly in operating a dynamo, great practical difficulties have been found, due to the inevitably great variation in the speed of revolution of the wind-motor itself, and consequently of the devices driven by it. So far as we are aware, the connection between these has heretofore always been positive, and in consequence the speed of the driven or working shaft has always varied exactly as the speed of the wind-wheel. When applied to the generation of electricity this inherent feature of the apparatus, as is obvious, has made the wind-wheel and connected parts, whenever revolving at a decreasing speed, operate to produce a heavy strain on all the working parts, especially on the dynamo. Furthermore, the degree of efficiency of the plant in producing current under the circumstances stated is obviously much impaired.

In carrying out our present improvements we have so organized the shafting directly connected to the wind-wheel and the dynamo-shaft with respect to each other that while the latter may always be caused to revolve at a speed not less than the speed of the former, yet when the speed of the windmill-shaft decreases the dynamo-shaft shall be free to run at its own speed and not be held back to coincide with the decreasing speed of the wind-shaft. We accomplish this result by inserting between the two shafts named, at some convenient point, as at C, a clutch connection of a well-known character, which we term for convenience an "intermissive" clutch, a specific form of which is shown at Fig. 2, one element of this connection being the driving or wind wheel shaft $W'$ and the other element being the driven or dynamo shaft $W^2$, the two being adapted to be engaged by means of balls $W^3$ free to move and be locked in wedge-shaped chambers or pockets, whereby the driving and the driven shafts will be connected or disconnected, according to their relative speeds. We do not, however, limit ourselves to the employment of the particular form of clutch shown. Further, we provide upon the driven or dynamo shaft a fly-wheel B or other convenient device for storing energy in order that said driven shaft shall possess an increased capacity or tendency of continuing the speed when the speed of the driving-shaft is for any cause reduced, whereby the energy so stored can be utilized to revolve the driven shaft after the driving-shaft by reason of its decreasing speed has become disconnected from it.

In place of the fly-wheel B we may construct any rotating part of any device operated by the driven shaft sufficiently heavy to store the desired amount of energy. The importance of such devices, when used in connection with the wind-motor, lies in the fact that the wind speed frequently decreases momentarily or temporarily, and during these periods of decrease, if the stored energy be utilized to continue driving the driven shaft until the speed of the driving-shaft recovers, the result will be the obtaining of a practically continuous speed of the driven shaft from the inevitably varying speed of the wind-wheel shaft, even under very unfavorable conditions.

We have further shown the dynamo D as electrically connected with a current-regulating device R and storage-battery S, although it will be understood that the current obtained from the dynamo may be utilized in other obvious ways.

The current-regulating device R is for the purpose of automatically disconnecting the dynamo from the storage-battery when, by reason of the decreasing speed of the dynamo, the voltage developed by it has fallen below the voltage of the storage-battery. It is evident that if this were not done a current would pass from the storage-battery through the dynamo. Said automatic regulator R may be any one of a number of such devices which are well known in the art, and we do not limit ourselves to the employment of any particular form.

When the wind-power operating the driving-shaft either dies out entirely or is not sufficient to propel the driven shaft at the required number of revolutions and it is desired to continue to operate machinery by the driven shaft, said shaft may be continuously operated for considerable periods of time by permitting an electrical current to pass from the storage-battery through the dynamo, thereby operating the dynamo as a motor and thus supporting the wind-motor and propelling the driven shaft at the required number of revolutions.

It may be advantageous at times when the wind has nearly or entirely died out to propel the driven shaft from the dynamo without at the same time operating the balance-wheel. This we accomplish by inserting between the balance-wheel and the dynamo a second intermissive clutch C' of the same general character as the one shown in Fig. 2. In this way the energy which would otherwise be drawn from the storage-battery and expended in driving the balance-wheel may be utilized directly upon any windmill work requiring the utilization of the dynamo as a motor, and in such work the balance-wheel may be dispensed with and one only of said clutches be inserted between the driving and the driven shaft.

We claim as our invention—

1. The improved device for the utilization of wind-power herein described, consisting of a wind-motor and a driving-shaft operated thereby, a driven shaft provided with a device for storing energy substantially as described, and an intermissive-clutch connection between the two shafts, all substantially as and for the purpose set forth.

2. In an improved system for the utilization of wind-power the combination of a wind-motor and a driving-shaft operated thereby, a driven shaft provided with a device for storing energy substantially as described, an intermissive-clutch connection between the two shafts, a dynamo driven by the driven shaft, a storage-battery connected in circuit with the dynamo, and an automatic current-regulating device, all substantially as described.

3. In an improved system for the utilization of wind-power the combination of a wind-motor and a driving-shaft operated thereby, a driven shaft, an intermissive-clutch connection between the two shafts, a dynamo arranged to be turned by the driven shaft, a storage-battery so connected with the dynamo that the latter may be used either to charge said battery or to be driven thereby, and an automatic current-regulating device, all substantially as described.

4. In an improved system for the utilization of wind-power, the combination of a wind-motor and a driving-shaft operated thereby, a driven shaft provided with a device for storing energy substantially as described, an intermissive-clutch connection between the two shafts, a dynamo arranged to be turned by the driven shaft, a storage-battery so connected with the dynamo that the latter may be used either to charge said battery or to be driven thereby, and an automatic current-regulating device, all substantially as described.

In testimony whereof we affix our signatures in presence of two witnesses.

WALTER L. NEGBAUR.
JOSEPH J. FEELY.

Witnesses:
FRED JOY,
ALFRED C. SMITH.